April 26, 1955  F. W. LIVERMONT  2,706,903
TORQUE MEASURING DEVICE
Filed March 10, 1951  3 Sheets-Sheet 1
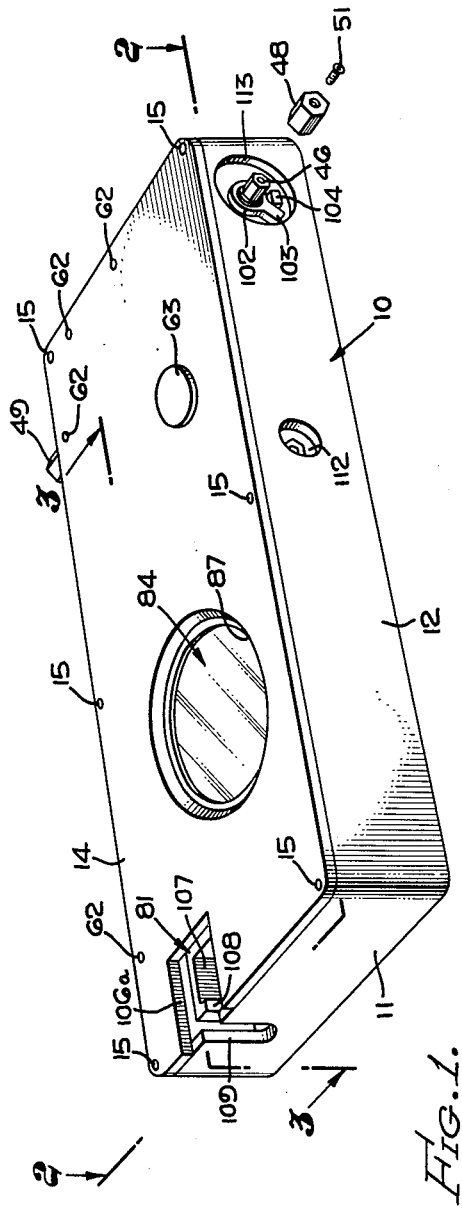
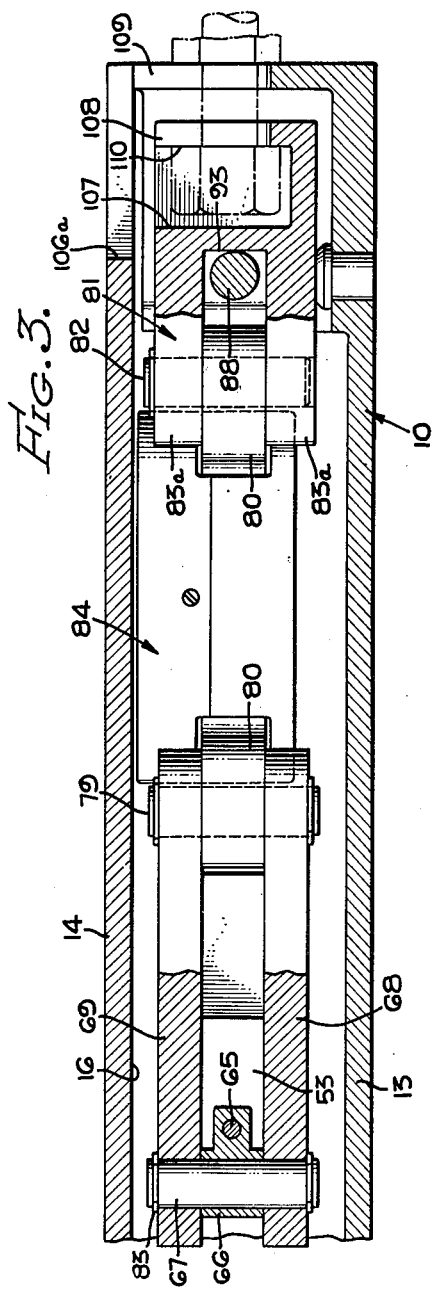
FRANK W. LIVERMONT,
INVENTOR.
BY *Lyon & Lyon*
ATTORNEYS

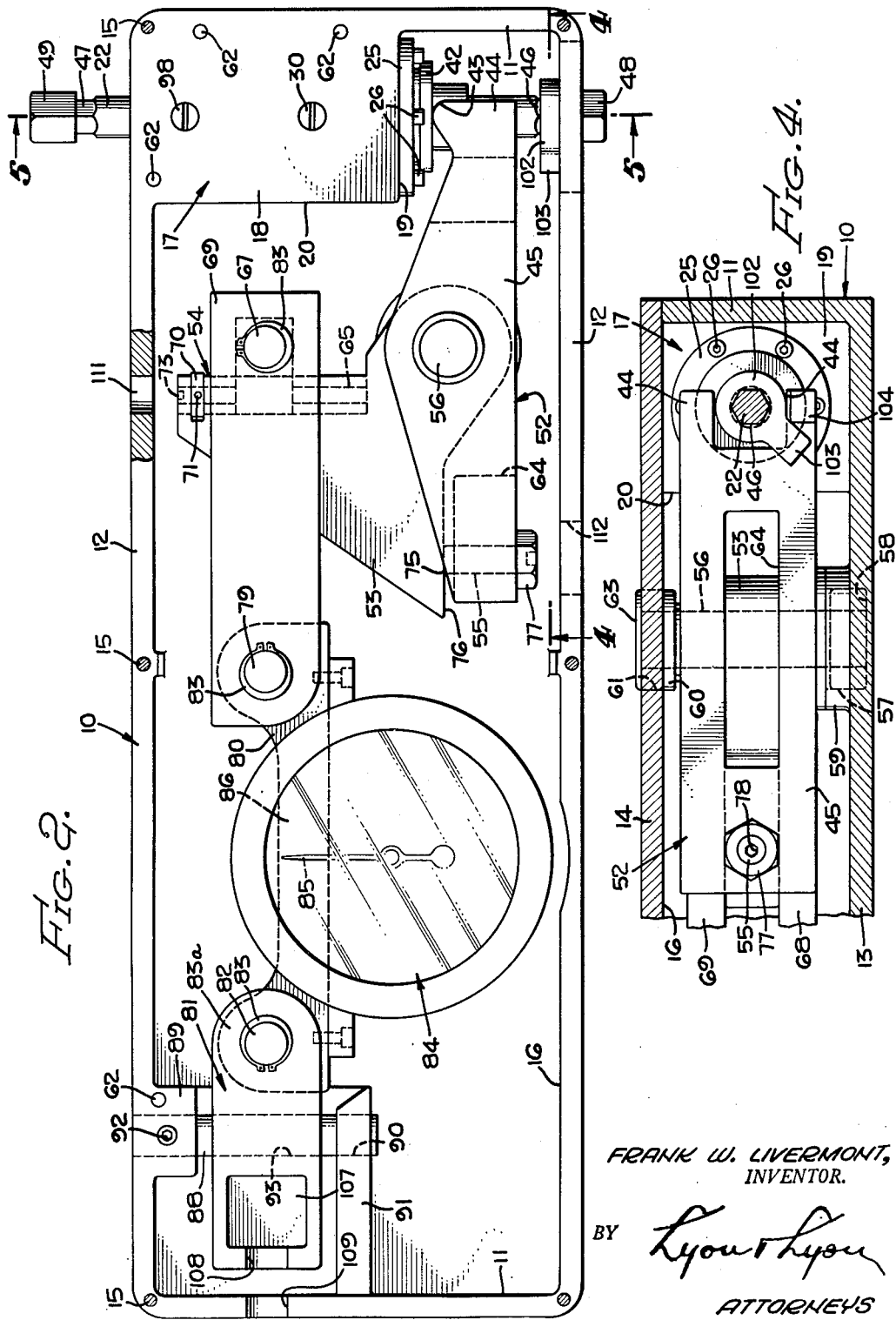

April 26, 1955  F. W. LIVERMONT  2,706,903
TORQUE MEASURING DEVICE
Filed March 10, 1951  3 Sheets-Sheet 3
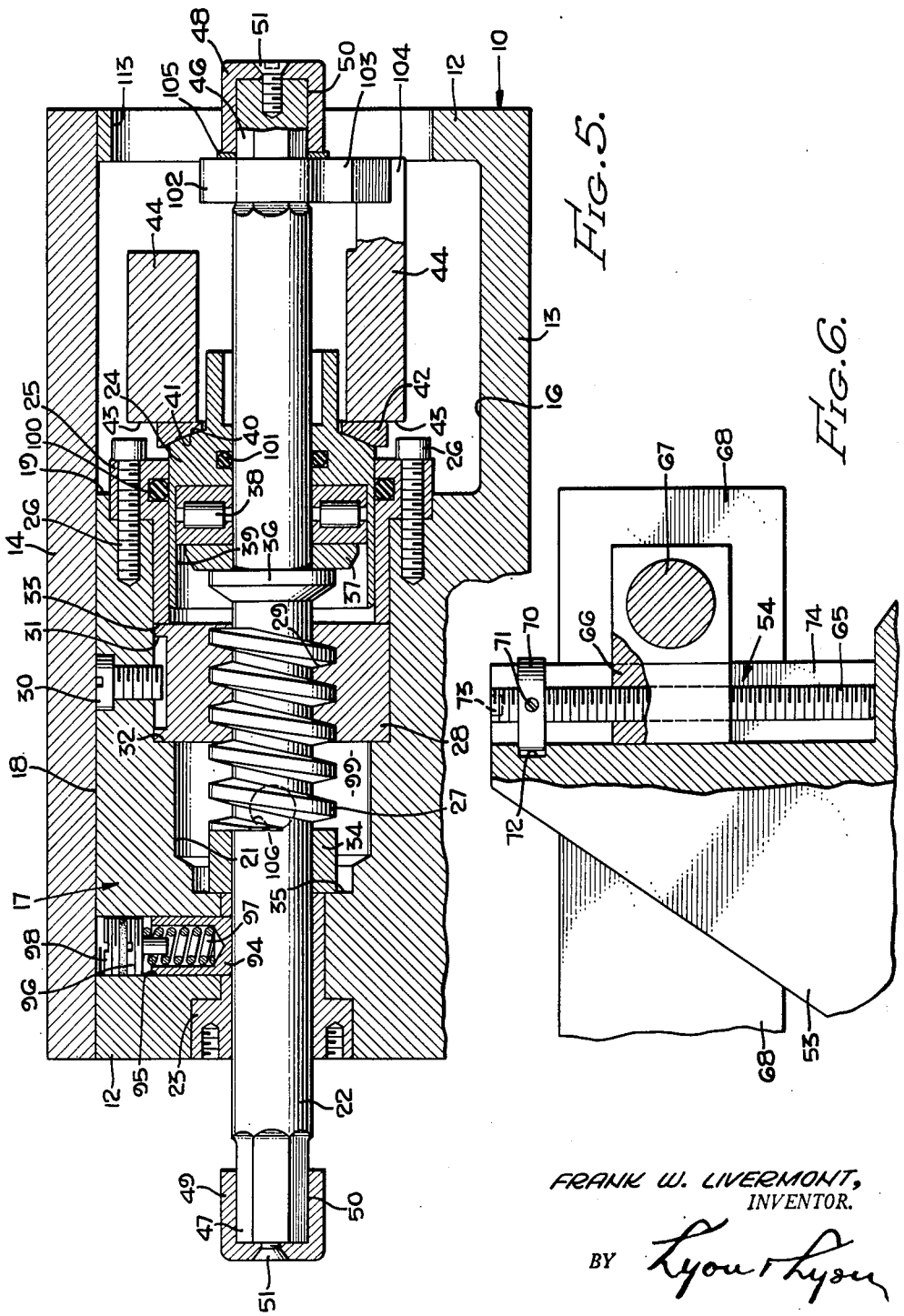
FRANK W. LIVERMONT,
INVENTOR.
BY Lyon & Lyon
ATTORNEYS :::::::::::::::::::::::::::::::::::::::::::::::::::::::::::::::::::::::::::::::::::::::::::::::

United States Patent Office 2,706,903
Patented Apr. 26, 1955

---

2,706,903

TORQUE MEASURING DEVICE

Frank Wendell Livermont, Duarte, Calif., assignor to Richmont, Inc., Los Angeles, Calif., a corporation of California Application March 10, 1951, Serial No. 214,955

6 Claims. (Cl. 73—1)

This invention relates to apparatus for measuring the tightening capacity of power driven wrenches and the like which are commonly used for "running" nuts on bolts and studs. The apparatus contemplated by this invention provides a means of accurately determining the tightening capacity, range and adjustment of powered nut runners employing a direct drive, a cushion clutch drive, a straight impact drive, and kinetic energy drivers, both electric and air driven. This invention contemplates the provision of an accurately formed pair of interengaging threaded elements for converting torque applied to one of the elements into axial force which can be measured accurately on a gage. This apparatus provides for direct reading of the torque delivering characteristics of a powered torque tool. Another feature of this invention is that the apparatus includes means for testing the frictional resistance of threaded fasteners. The apparatus is thus useful for setting up a standard of clamping force for threaded connections.

Among the objects of this invention is to provide a torque measuring device of this type which is rugged in construction, which is not apt to get out of order, and which does not require any power connection for its operation.

Other objects and advantages will appear hereinafter.

In the drawings:

Figure 1 is a perspective view showing a preferred embodiment of my invention.

Figure 2 is a plan view of the device with the cover plate removed, the view being taken substantially on the line 2—2 as shown in Figure 1.

Figure 3 is a sectional elevation partly broken away taken substantially on the line 3—3 as shown in Figure 1.

Figure 4 is a sectional detail taken substantially on the line 4—4 as shown in Figure 2.

Figure 5 is a sectional elevation taken substantially on the line 5—5 as shown in Figure 2.

Figure 6 is a fragmentary detail partly in section showing the adjustable connection between the link and crank assembly.

Referring to the drawings, the base 10 is provided with end walls 11 and side walls 12 integrally joined by bottom wall 13. A cover plate 14 is removably secured to the base 10 by means of threaded fastenings 15, and this cover plate cooperates with the base to define an enclosure 16. A housing 17 is formed integrally in one corner of the base 10. This housing includes a top wall 18, an end wall 19, and a side wall 20. The housing is provided with a stepped bore 21 which extends axially therethrough. A shaft 22 extends through the bore in the housing and projects through the side walls 12 of the base 10.

Means are provided for mounting the screw shaft 22 for turning movement and for axial movement relative to the housing 17. As shown in the drawings, this means includes a bushing 23 fixed in the housing 17 and a bushing 24 slidably carried in the clamping sleeve 25. The clamping sleeve 25 is secured to the housing 17 by means of threaded fastening elements 26. A helical thread 27 is ground or otherwise formed on a portion of the shaft 22. This thread is held to very close tolerances so that its dimensions are substantially uniform throughout its length. A nut 28 has an internal thread 29 which is also accurately and precisely formed to cooperate with the thread 27 on the shaft. The high quality of the threads in the nut and on the shaft assures a maximum of contact area with a minimum of backlash. The frictional characteristics between the nut and the screw shaft 22 therefore remain substantially constant.

A set screw 30 on the top wall 18 of the housing 17 engages an axial slot 31 in the periphery of the nut 28 to prevent rotation of the nut with respect to the housing 17. The nut 28 engages a shoulder 32 at one side and is engaged by the end 33 of the sleeve on the other side to prevent it from moving axially within the housing 17. A spacer collar 34 on the screw shaft 22 engages the shoulder 35 on the housing to limit axial movement of the screw shaft 22 in one direction. Axial movement of the screw shaft in the other direction is communicated through the integral shaft flange 36 to the collar 37 and to the thrust bearing assembly 38. This thrust bearing assembly 38 is confined within the bore 39 and the bushing 24. A spherical end surface 40 on the bushing 24 engages a similar surface 41 on the self-aligning collar 42. This collar in turn bears against rounded nose portions 43 on the bifurcated ends 44 on the arm member 45.

The screw shaft 22 is provided with noncircular end portions 46 and 47, and wear sleeves 48 and 49 are mounted thereon. The sleeves are each provided with a noncircular socket 50 which is shaped to fit the noncircular portions 46 and 47 on the screw shaft 22. The outer periphery of the wear sleeves 48 and 49 are noncircular and are preferably hexagonal or octagonal to simulate the outer surface of the nut. A wrench or a power driven nut runner or the like may be applied to either of the sleeves 48 and 49 to turn the screw shaft 22. The sleeves 48 and 49 may be held in assembled position on the shaft by means of suitable threaded fastenings 51.

The bell crank assembly generally designated 52 includes the arm member 45, the arm member 53, the adjustment device 54 and the stop element 55. The arm members 45 and 53 are each pivotally mounted on the vertical pivot pin 56. The lower end of this pivot pin 56 is carried in a bearing 57 mounted within a circular recess 58 provided in a boss 59 formed integrally with the bottom wall 13 of the base 10. The upper end of the pivot pin 56 is received within a bearing 60 mounted in an opening 61 in the cover plate 14. Dowel pins 62 are provided to align the cover plate 14 with the base 10 so that the upper end of the pivot pin 56 is accurately aligned by the bearing 60. A cap 63 on the bearing 60 serves to prevent entrance of foreign matter into the enclosure 16. The arm member 45 has a central opening 64 through which a portion of the arm member 53 extends for engagement with the pivot pin 56. The stop element 55 comprises a set screw threaded into the arm member 45 and having a projecting end 75 engaging a shoulder 76 on the arm member 53. A lock nut 77 is provided to secure the set screw 55 in adjusted position. A noncircular recess 78 may be provided in the end of the set screw 55 for the purpose of turning it when desired.

The adjusting means 54 includes an externally threaded element 65 which extends through cooperating internal threads mounted on a lug 66. A vertical pin 67 connects the lug 66 to one end of the parallel tension links 68 and 69. A ring collar 70 is fixed to the threaded element 65 by means of a set screw 71, and this ring collar 70 is mounted to turn within a groove 72 provided in the arm member 53. A noncircular recess 73 may be provided in the upper end of the threaded element 65 for turning it and thus causing the lug 66 to move along the arm member 53 and to travel in the recess 74 formed therein. The adjustment device 54 thus provides a means of adjusting the linear distance between the pins 67 and 56.

The tension links 68 and 69 are connected by means of pin 79 to one end of the gage bar 80. The other end of the gage bar 80 is connected to the end fitting 81 by means of the pin 82. Suitable retainer rings 83 may be provided for holding each of the pins 67, 79 and 82 in operative position. A dial gage 84 of conventional design is mounted on the gage bar 80 and is provided with an indicating hand 85 and scale 86 which show the amount of extension of the gage bar 80 under tension load. The gage 84 may be of the general type shown in the Dillon Patent No. 2,287,299. An opening 87 is provided in the cover plate 14 so that the gage reading may be observed.

The end fitting 81 is bifurcated to provide arms 83ᵃ which straddle the gage bar 80. A stationary horizontal pin 88 is mounted at one end in a hollow boss 89 on the rear wall 12, and the other end is carried in a bore 90 provided on a vertical wall 91 which is joined integrally with the bottom wall 13 and end wall 11. The pin 88 is held in position by means of a set screw 92. The arms 83 on the end fitting 81 straddle the pin 88, and the shoulder 93 on the end fitting 81 normally engages the side of the pin 88.

When a power driven nut runner or the like is to be tested, it is provided with the usual driving socket (not shown) corresponding to the size of nut it is intended to engage. A wear sleeve 48 or 49 having an external configuration corresponding to such socket is mounted on the screw shaft 22. If the nut runner rotates in a clockwise direction for running right-hand nuts, the wear sleeve 48 is positioned on the end 46 of the shaft 22. If the nut runner turns in a counterclockwise direction for running left-hand nuts, the wear sleeve 49 is mounted on the end 47 of the screw shaft 22. When the torque of the power driven nut runner is applied to the screw shaft 22 the shaft turns in a clockwise direction as viewed in Figure 4. Since the nut 28 is held stationary, the threads 27 on the shaft turn within the threads 29 on the nut and the shaft is caused to move axially toward the right as viewed in Figure 5. The axial end thrust thus developed is applied through the thrust bearing assembly 38 to the self-aligning collar 42 and to the arm member 45 through the rounded ends 43. This causes the arm member 45 to pivot about the vertical pivot pin 56 in a clockwise direction as viewed in Figure 2. The arm member 53 turns with the arm member 45 because the stop member 55 engages the shoulder 76. This movement of the arm member 53 is communicated to the tension links 68 and 69 by means of the pin 67, and this tension is applied to the gage bar 80 through the pin 79. The pin 82 does not move because it is anchored through the end fitting 81 and horizontal anchor pin 88. From this description it will be understood that the turning effort or torque applied to the screw shaft 22 is measured by the elongation of the gage bar 80 and indicated by the gage 84. The gage 84 may be calibrated in foot pounds to provide a direct reading.

A friction drag of constant magnitude may be applied to the screw shaft 22, and as shown in the drawings, this may be developed by means of a shoe 94 slidably mounted in a radial passage 95 provided in the housing 17. A stationary screw plug 96 may be mounted in the outer end of the passage and a coil spring 97 may be operatively interposed between this plug and the shoe 94 to cause it to develop frictional resistance with the shaft surface. A second plug 98 may be provided to seal the radial passage against leakage of oil. The oil is contained within the chamber 99 defined within the stepped bore 21, and the oil serves to lubricate the interfitting threads 27 and 29, the thrust bearing 38, and the rotary contact of the shaft 22 within the bushings 23 and 24. Seal rings 100 and 101 may be provided to prevent leakage of oil. A filler opening 106 may be provided in the wall of the housing 17 for introducing oil into the chamber 99. This opening is normally plugged by any convenient means to prevent escape of oil and to exclude foreign matter from the chamber.

A stop ring 102 is provided with a projecting finger 103 which engages a lug 104 provided on the lower arm 44 of the member 45. The stop ring 102 is provided with a noncircular bore to receive the noncircular end 46 of the screw shaft 22. As shown in Figure 4, the engagement of the finger 103 with the lug 104 serves to limit rotation of the screw shaft 22 in a counterclockwise direction. The stop ring 102 is held in place on the shaft by means of the wear sleeve 48 and washer 105.

The bell crank assembly 52 is formed of two separate members 45 and 43 in order that their relative angular position may be adjusted initially. The screw stop 55 may be turned so that the arm member 45 is so positioned that the curved contacts 43 have a minimum of transverse sliding movement during the axial travel of the self-aligning ring 42. Once it is initially set, the position of the threaded member 55 seldom needs to be adjusted. The threaded element 65 is used for changing the linear distance between the pins 56 and 57 so that the tension in the links 68 and 69 may be initially adjusted for any given torque load on the bell crank assembly 52 in order that the reading of the dial gage 84 shall provide a direct measure of the foot pounds of torque applied to the screw shaft 22.

When it is desired to measure the relative friction and clamping pressure produced by a typical bolt and nut assembly, the bolt is lowered through the opening 106a provided in the cover plate 14 so that the bolt head is received within the pocket 107 provided on the end fitting 81, and so that the threaded shank of the bolt extends through the slot 108 in the end fitting and the slot 109 in the end wall 11. A nut is threaded on the shank of the bolt until it engages the surface of the end wall 11 in the manner shown in Figure 3. The underside of the bolt head engages the abutment surface 110 which forms one wall of the pocket 107. When the nut is turned relative to the shank of the bolt, the end fitting 81 is drawn to the right, as shown in Figure 3, so that the shoulder 93 moves away from the horizontal anchor pin 88. The tension links 68 and 69 cause the bell crank assembly 52 to turn counterclockwise as viewed in Figure 2 until the ends 43 on the arm member 45 engage the self-aligning ring 42. Further turning movement of the nut relative to the bolt shank serves to tension the gage bar 80 and hence cause the gage 84 to provide an indication of the tension load developed. If a torque wrench is used for turning the nut, the torque applied can be observed on the dial of the torque wrench and the corresponding tension forces developed are indicated by the gage 84. A separate calibrated scale is desirable for indicating the pounds of tension developed.

Suitable access openings may be provided in the walls of the base 10. Thus, opening 111 may be provided for access to the end of the threaded element 65, and opening 112 may be provided for access to the end of the threaded stop element 55. The diameter of the opening 113 in the forward side wall 12 is sufficiently large to permit axial assembly of the nut 28, bushing 25 and related parts inwardly through the opening.

Having fully described my invention, it is to be understood that I do not wish to be limited to the details herein set forth, but my invention is of the full scope of the appended claims.

I claim:

1. Torque measuring apparatus of the class described, comprising in combination: a base, cooperating screw and nut members on the base, one of the members being mounted for axial and turning movement on the base, means on the end of the said member for applying torque thereto, the other member being fixed relative to the base and cooperating with the first member to cause it to move axially upon torque being applied to said means, a bell crank pivotally mounted on the base and having two arms, means including a thrust bearing operatively interposed between the first member and one of the bell crank arms whereby axial movement of the first member causes pivotal movement of said bell crank, and tension indicating means on the base operatively connected to the other arm.

2. Torque measuring apparatus of the class described, comprising in combination: a base, a screw shaft mounted for axial and turning movement on the base, means on the end of the shaft for applying torque to the shaft, a screw thread on the shaft, a stationary nut fixed relative to the base and cooperating with the shaft threads to cause the shaft to move axially upon torque being applied to said means, a bell crank pivotally mounted on the base and having two arms, means including a thrust bearing operatively interposed between the screw shaft and one of the arms, whereby axial movement of the screw shaft causes pivotal movement of said bell crank, and tension indicating means operatively connected to the other arm.

3. Torque measuring apparatus of the class described, comprising in combination: a base, cooperating screw and nut members on the base, one of the members being mounted for axial and turning movement on the base, means on the end of the said member for applying torque thereto, the other member being fixed relative to the base and cooperating with the first member to cause it to move axially upon torque being applied to said means, a bell crank assembly, a pivot pin fixed relative to the base, the bell crank assembly including a first arm pivotally mounted on said pin, means including a thrust bearing operatively interposed between the first member and said arm, whereby axial movement of the first member causes pivotal movement of said arm about said pin, the bell crank assembly including a second arm pivotally mounted on said pin, adjustable means for varying the relative angular position of said arms, and tension indicating means operatively connected to said second arm.

4. Apparatus for measuring the torque applied by a powered nut runner or the like, comprising in combination: a base, a screw shaft mounted for axial and turning movement on the base, means on the end of the shaft for applying torque to the shaft, a screw thread on the shaft, a stationary nut fixed relative to the base and cooperating with the shaft threads to cause the shaft to move axially upon torque being applied to said means, a bell crank assembly, a pivot pin fixed relative to the base, the bell crank assembly including a first arm pivotally mounted on said pin, means including a thrust bearing operatively interposed between the screw shaft and said arm, whereby axial movement of the screw shaft causes pivotal movement of said arm about said pin, the bell crank assembly including a second arm pivotally mounted on said pin, adjustable means for varying the relative angular position of said arms, a tension link pivotally connected to the second arm, and tension indicating means connected to said link.

5. Apparatus for measuring the torque applied by a powered nut runner or the like, comprising in combination: a base, a screw shaft mounted for axial and turning movement on the base, means on the end of the shaft for applying torque to the shaft, a screw thread on the shaft, a stationary nut fixed relative to the base and cooperating with the shaft threads to cause the shaft to move axially upon torque being applied to said means, a bell crank assembly, a pivot pin fixed relative to the base, the bell crank assembly including a first arm pivotally mounted on said pin, means including a thrust bearing operatively interposed between the screw shaft and said arm, whereby axial movement of the screw shaft causes pivotal movement of said arm about said pin, the bell crank assembly including a second arm pivotally mounted on said pin, adjustable means for varying the relative angular position of said arms, a tension link, a pin pivotally connecting the link to the second arm, means for shifting the position of the last said pin relative to the second arm, and tension indicating means connected to said link.

6. Apparatus for measuring the torque applied by a powered nut runner or the like, comprising in combination: a base, a screw shaft mounted for axial and turning movement on the base, means on the end of the shaft for applying torque to the shaft, a screw thread on the shaft, a stationary nut fixed relative to the base and cooperating with the shaft threads to cause the shaft to move axially upon the torque being applied to said means, a tension gage on the base calibrated in units of torque, and mechanical linkage means on the base operatively interposed between the screw shaft and the gage for tensioning an element of the gage in response to axial movement of the screw shaft.

References Cited in the file of this patent

UNITED STATES PATENTS

| | | |
|---|---|---|
| 2,287,299 | Dillon | June 23, 1942 |
| 2,441,608 | Warner | May 18, 1948 |
| 2,464,152 | Rolston | Mar. 8, 1949 |
| 2,469,381 | Galko | May 10, 1949 |
| 2,486,632 | Burke | Nov. 1, 1949 |
| 2,503,649 | Zimmerman | Apr. 11, 1950 |